(12) United States Patent
Gauld

(10) Patent No.: US 12,536,534 B2
(45) Date of Patent: Jan. 27, 2026

(54) IDENTITY VERIFICATION SYSTEMS AND METHODS

(71) Applicant: NCR Atleos Corporation, Atlanta, GA (US)

(72) Inventor: Frank Joseph Lamont Gauld, Edinburgh (GB)

(73) Assignee: NCR Atleos Corporation, Atlanta, GA (US)

( * ) Notice: Subject to any disclaimer, the term of this patent is extended or adjusted under 35 U.S.C. 154(b) by 290 days.

(21) Appl. No.: 15/365,559

(22) Filed: Nov. 30, 2016

(65) Prior Publication Data
US 2018/0150839 A1    May 31, 2018

(51) Int. Cl.
*G06Q 20/40*    (2012.01)
*G06F 16/951*    (2019.01)
(Continued)

(52) U.S. Cl.
CPC ....... *G06Q 20/4014* (2013.01); *G06F 16/951* (2019.01); *G06F 21/32* (2013.01);
(Continued)

(58) Field of Classification Search
CPC .. G06Q 20/4014; G06Q 40/00; G06F 16/951; G06F 21/32
(Continued)

(56) References Cited

U.S. PATENT DOCUMENTS

| | | | | |
|---|---|---|---|---|
| 4,701,960 A | * | 10/1987 | Scott | G07C 9/35 382/122 |
| 5,559,895 A | * | 9/1996 | Lee | G06V 40/30 382/119 |

(Continued)

FOREIGN PATENT DOCUMENTS

CN    103250132 A    *    8/2013    ............... G06F 9/44

OTHER PUBLICATIONS

Plamondon et. al, "Online and off-line handwriting recognition: a comprehensive survey", https://ieeexplore.ieee.org/document/824821, Jan. 2000 (Year: 2000).*

(Continued)

*Primary Examiner* — Matthew S Gart
*Assistant Examiner* — Mark A Malkowski
(74) *Attorney, Agent, or Firm* — Schwegman Lundberg & Woessner, P.A.

(57) ABSTRACT

Various embodiments herein each include at least one of systems, methods, and software for identity verification. Some such embodiments identify a user based on analysis of their handwriting. Some such embodiments may be utilized to authenticate an individual, for emergency authentication or when other authentication solutions are not available, as one of a two or more step authentication process, authenticating checks, authenticating a signature or other handwriting on another document, and the like. One embodiment, in the form of a method, includes storing a set of handwriting characteristics of an individual identified during processing of a plurality of handwriting samples of the individual. The method may then determine whether an input handwriting sample is handwriting of the individual based on the stored set of handwriting characteristics of the individual and then output a result of the determining.

7 Claims, 4 Drawing Sheets

(51) Int. Cl.
   *G06F 21/32* (2013.01)
   *G06Q 20/04* (2012.01)
   *G06V 40/30* (2022.01)

(52) U.S. Cl.
   CPC ......... *G06Q 40/028* (2025.08); *G06Q 20/042* (2013.01); *G06Q 20/0425* (2013.01); *G06V 40/33* (2022.01)

(58) Field of Classification Search
   USPC .................................................. 705/35–45
   See application file for complete search history.

(56) References Cited

U.S. PATENT DOCUMENTS

| | | | | |
|---|---|---|---|---|
| 6,424,728 | B1* | 7/2002 | Ammar | G06V 40/30 382/119 |
| 7,168,614 | B2* | 1/2007 | Kotovich | G06Q 20/389 382/116 |
| 7,545,982 | B2* | 6/2009 | Houle | G06V 40/30 382/187 |
| 7,636,457 | B2* | 12/2009 | Franke | G06F 18/24765 600/595 |
| 9,520,034 | B1* | 12/2016 | Walker | G07F 9/009 |
| 2001/0018739 | A1* | 8/2001 | Anderson | G06Q 20/40 380/243 |
| 2002/0152170 | A1* | 10/2002 | Dutta | G07F 19/201 382/137 |
| 2003/0138135 | A1* | 7/2003 | Chung | G07C 13/00 382/119 |
| 2005/0035193 | A1* | 2/2005 | Gustin | G06Q 20/042 235/379 |
| 2006/0041506 | A1* | 2/2006 | Mason | G06Q 20/042 705/42 |
| 2006/0187698 | A1* | 8/2006 | Schmidt | G06Q 20/04 365/96 |
| 2006/0202012 | A1* | 9/2006 | Grano | G06Q 20/042 705/45 |
| 2007/0084911 | A1* | 4/2007 | Crowell | G06Q 20/042 235/379 |
| 2008/0005579 | A1* | 1/2008 | Gaines | G06F 21/32 713/181 |
| 2009/0164372 | A1* | 6/2009 | Dell | G07F 19/202 705/45 |
| 2009/0173781 | A1* | 7/2009 | Ramachandran | G06Q 20/042 235/379 |
| 2010/0161466 | A1* | 6/2010 | Gilder | G06Q 40/12 705/40 |
| 2013/0028502 | A1* | 1/2013 | Nepomniachtchi | G06V 30/162 382/137 |
| 2013/0103582 | A1* | 4/2013 | Singfield | G07F 19/202 705/43 |
| 2013/0159183 | A1* | 6/2013 | Lopez | G06Q 20/042 705/42 |
| 2014/0040141 | A1* | 2/2014 | Gauvin | G06V 30/1448 705/45 |
| 2015/0254655 | A1* | 9/2015 | Bondesen | G06Q 20/3821 705/72 |
| 2017/0046560 | A1* | 2/2017 | Tsur | G06Q 20/325 |

OTHER PUBLICATIONS

Donato et. Al, "Automatic Signature Verification: The State of the Art", https://ieeexplore.ieee.org/xpl/tocresult.jsp?isnumber=4603093&punumber=5326 , published in IEEE Transactions on Systems, Man, and Cybernetics, Part C (Applications and Reviews) ( vol. 38, Issue: 5, Sep. 2008) (Year: 2008).*

Desai Et. Al, "Forensic Examination Of Handwriting And Signatures", International Journal of Innovative Research and Development, https://www.internationaljournalcorner.com/index.php/ijird_ojs/issue/view/8152 , 2013 (Year: 2013).*

Bertrand Et. Al "A Conditional Random Field Model for Font Forgery Detection", https://ieeexplore.ieee.org/document/7333827 , 2015 (Year: 2015).*

Chianese et. al, "Recovering dynamic information from static handwriting.", Pattern Recognition, vol. 26, No. 3., 409, 418, accessed via https://www.researchgate.net/publication/220602224_Recovering_dynamic_information_from_static_handwriting (Year: 1993).*

Haffeman et. al, "Offline Handwritten Signature Verification—Literature Review", https://arxiv.org/pdf/1507.07909v2 , 2015 (Year: 2015).*

Forensic science simplified—"A Simplified Guide To Forensic Document Examination" https://web.archive.org/web/20131008222119/https://www.forensicsciencesimplified.org/docs/QuestionedDocuments.pdf , archived 2013 (Year: 2013).*

* cited by examiner

IDENTITY VERIFICATION SYSTEMS AND METHODS

BACKGROUND INFORMATION

Consumer and user authentication methods are varied and typically involve a consumer knowing something (e.g., Personal Identification Number "PIN" or password), having something (smart card), or something they "are" (e.g., a fingerprint). While these solutions work well, or at least sufficiently, new methods are needed to provide new and different authentication options when other solutions have been compromised, for use as a secondary authentication mechanism, to reset other authentication credentials, and the like.

SUMMARY

Various embodiments herein each include at least one of systems, methods, and software for identity verification. Some such embodiments identify a consumer or user based on analysis of their handwriting on checks, other documents, or as input on a signature pad or other handwriting input device. Some such embodiments may be utilized to authenticate an individual, for emergency authentication or when other authentication solutions are not available, as one of a two or more step authentication process, authenticating checks, authenticating a signature or other handwriting on another document, and the like.

One embodiment, in the form of a method, includes storing a set of handwriting characteristics of an individual identified during processing of a plurality of handwriting samples of the individual. The method may then determine whether an input handwriting sample is handwriting of the individual based on the stored set of handwriting characteristics of the individual and then output a result of the determining.

Another method embodiment includes identifying an individual from whom a handwriting sample was received as input based on stored sets of handwriting characteristics of a plurality of individuals and outputting data identifying the individual from whom the handwriting sample was received when the individual is identified, otherwise outputting data indicating no identification was made.

A further embodiment, in the form of a system, includes a processor, a memory device, a network interface device, and instructions stored on the at least one memory device that are executable by the processor to perform data processing activities. The data processing activities, in some embodiments, include storing, on the memory device, a set of handwriting characteristics of an individual identified during processing of a plurality of handwriting samples of the individual. The data processing activities may further include determining whether an input handwriting sample received via the network interface device is handwriting of the individual based on the stored set of handwriting characteristics of the individual. Subsequently, the data processing activities include outputting a result of the determining via the network interface device.

DETAILED DESCRIPTION

Figure 1:
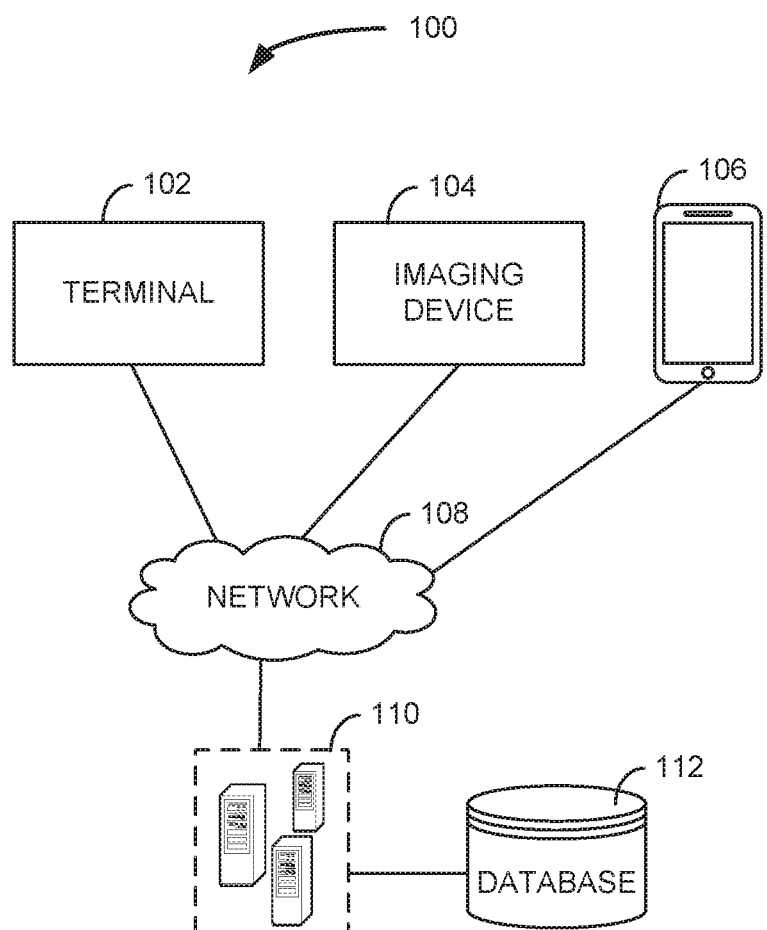
FIG. 1 is a logical block diagram of a system architecture, according to an example embodiment.

Various embodiments herein each include at least one of systems, methods, and software for identity verification. Some such embodiments identify a consumer or user based on analysis of their handwriting on checks, other documents, or as input on a signature pad or other handwriting input device. Some such embodiments may be utilized to authenticate an individual, for emergency authentication or when other authentication solutions are not available, as one of a two or more step authentication process, authenticating checks, authenticating a signature or other handwriting on another document, and the like.

Security and Consumer authentication is a major concern and is a constant battle in many instances, such as in banking. Some embodiments herein provide a solution, that may be provided as an Application Programming Interface (API), one or a set of web services, and the like. Some such solutions may leverage a check processor's check image archive which may not be viewed as a strategic asset in a financial institution or an archive of other documents including handwriting associated with known individuals. Such embodiments are able to identify and store data representations of unique characteristics of an individual's handwriting from such archived handwriting samples, newly received handwriting samples, and handwriting received as learning input for proposes authentication of the identity of the individual based on handwriting, such as a signature, received at a later time. Such embodiments provide a new authentication solution that the individual does not need to know or have, rather it is something that just is. Such embodiments may enable authentication of the individual in emergency situations when other identification items or solutions are not available or fail, for secondary authentication, to verify the authenticity of a handwritten check or check signature, such as when a check amount is over a certain value, and the like.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices.

Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 architecture, according to an example embodiment. The system 100 is an example of a system on which some embodiments may be implemented. For example, the database 112 may store an archive of documents, such as processed checks, signed documents, handwritten documents, and the like, or portions thereof, in electronic image form.

One or more processes that execute on one or more servers 110 may execute against archived documents stored in the database 112 to identify characteristics of individuals handwriting across a plurality of documents associated in stored data with individuals' respective identities. Characteristics of handwriting that are identified and extracted from handwriting samples may include characteristics such as what is referred to as skill level, or neatness in terms of fluid, rhythmic, and artistic embellishment. Other characteristics may include slant or inclination of characters, character forms, movement of a writing utensil when forming characters or portions thereof, proportions of character portions compared to the whole character or other portions, height rations of characters with relation to one or more other characters, loop shape and form, pressure as is evident from line width, writing utensil lifting when forming certain characters, exit and entry strokes for characters, retracing, character and word spacing, case of letters, and other characteristics. These characteristics as may be extracted with regard to a particular individual are generally unique to the individual. The degree of the uniqueness may be lesser or greater depending upon the number of characteristics taken into account and in combination. The degree of uniqueness may be complete or a bit lower. The degree of a particular embodiment may be set based on a configuration setting of the software that extracts the characteristics and build a data representation of the characteristics, which may be considered as a handwriting fingerprint. Once a handwriting fingerprint is established for an individual, a data representation of the handwriting fingerprint is stored to the database 112. The database 112 typically stores handwriting fingerprints for a plurality of individuals. Note that it is quite possible for a single individual to have two handwriting fingerprints in some embodiments, such as when an individual utilizes two or more distinct handwriting styles (e.g., block letters and cursive). However, some embodiments may limit an individual to a single handwriting fingerprint.

Once an individual has a handwriting fingerprint, the handwriting fingerprint may be utilized in various ways, depending on the embodiment. For example, the handwriting fingerprint may be used utilized to verify the authenticity of a signature on checks drawn against an account of an individual, which may be for all checks, checks over a certain dollar amount, checks randomly selected, or otherwise. The handwriting fingerprint may be considered at a time when an imaging device 104 acquires an image of check based on data retrieved from the database 112 over a network 108, such as the Internet. In other embodiment, the check image may be transmitted over the network from the imaging device 104 to the one or more servers 110 via an API or web service call. Note that the imaging device 104 may be a check reading and imaging device, a camera, a scanner, a product scanner, a handheld scanner, or other imaging device that may be located in a check processing facility, at a terminal such as terminal 102 described below, a document imaging facility, and the like.

A handwriting fingerprint may also be utilized at a terminal 102, such as an automated teller machine (ATM), airline check-in kiosk, library checkout kiosk, or other terminal. In some embodiments, the terminal 102 may utilized the handwriting fingerprint locally or may transmit handwriting data over the network 108 to the one or more servers 110 via an API or web service call. The handwriting data may be received as input via the imaging device 104, an electronic signature pad device coupled to the terminal 102, a handwriting input received via a touch screen by a finger or stylus, and the like.

The terminal 102 in some embodiments may be in the form of a mobile device 106. The mobile device 106 may be a smartphone, handheld computing device, a tablet, a smartwatch or other device having a similar form factor and the like.

Figure 2:
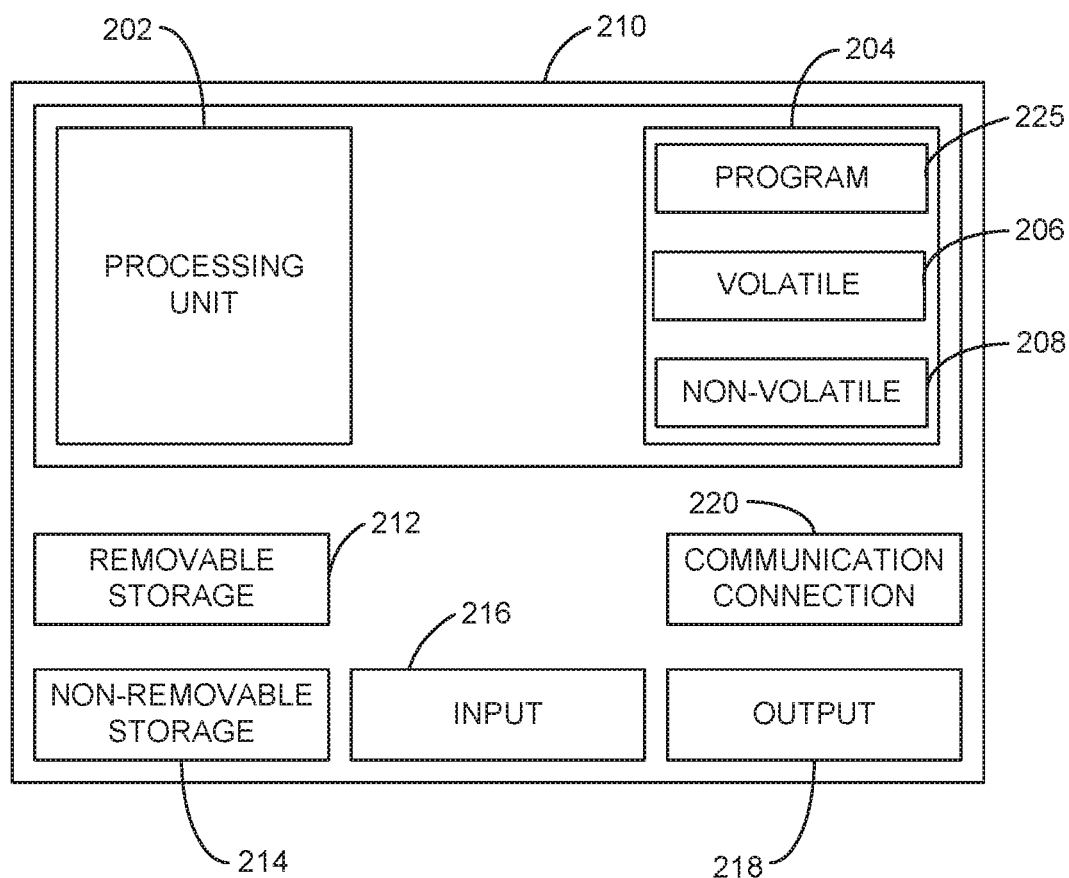
FIG. 2 is a block diagram of a computing device, according to an example embodiment.

FIG. 2 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 210, may include a processing unit 202, memory 204, removable storage 212, and non-removable storage 214. Although the example computing device is illustrated and described as computer 210, the computing device may be in different forms in different embodiments. For example, the computing device may instead be a smartphone, a tablet, smartwatch, or other computing device including the same or similar elements as illustrated and described with regard to FIG. 2. Devices such as smartphones, tablets, and smartwatches are generally collectively referred to as mobile devices. Further, although the various data storage elements are illustrated as part of the computer 210, the storage may also or alternatively include cloud-based storage accessible via a network, such as the Internet.

Returning to the computer 210, memory 204 may include volatile memory 206 and non-volatile memory 208. Computer 210 may include—or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 210 may include or have access to a computing environment that includes input 216, output 218, and a communication connection 220. The input 216 may include one or more of a touchscreen, touchpad, mouse, keyboard, camera, one or more device-specific buttons, one or more sensors integrated within or coupled via wired or wireless data connections to the computer 210, and other input devices. The computer 210 may operate in a networked environment using a communication connection 220 to connect to one or more remote computers, such as database servers, web servers, and other computing device. An example remote computer may include a personal computer (PC), server, router, network PC, a peer device or other common network node, or the like. The communication connection 220 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 220 may also or alternatively include a transceiver device, such as a BLUETOOTH® device that enables the computer 210 to wirelessly receive data from and transmit data to other BLUETOOTH® devices.

Computer-readable instructions stored on a computer-readable medium are executable by the processing unit 202 of the computer 210. A hard drive (magnetic disk or solid state), CD-ROM, and RAM are some examples of articles including a non-transitory computer-readable medium. For example, various computer programs 225 or apps, such as one or more applications and modules implementing one or more of the methods illustrated and described herein or an app or application that executes on a mobile device or is accessible via a web browser, may be stored on a non-transitory computer-readable medium.

Figure 3:
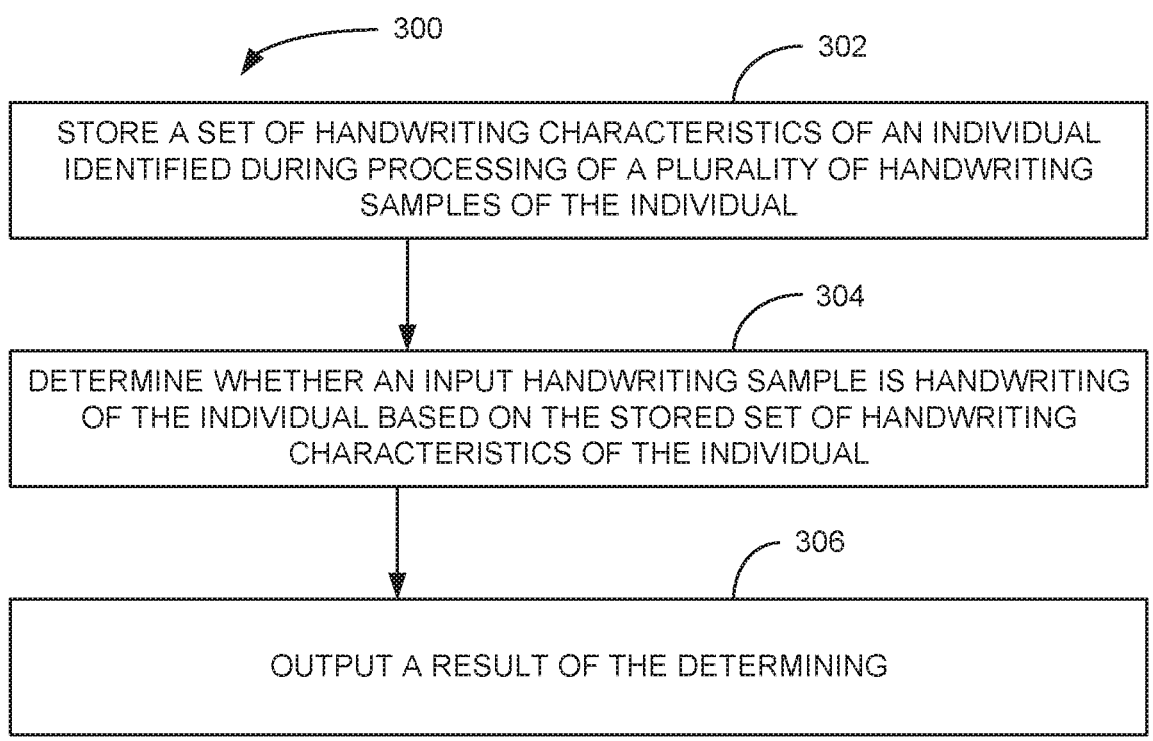
FIG. 3 is a block flow diagram of a method, according to an example embodiment.

FIG. 3 is a block flow diagram of a method 300, according to an example embodiment. The method 300 is an example of a method that may be performed in whole or in part on the one or more servers 110 of FIG. 1.

The method 300 includes storing 302 a set of handwriting characteristics of an individual identified during processing of a plurality of handwriting samples of the individual and determining 304 whether an input handwriting sample is handwriting of the individual based on the stored set of handwriting characteristics of the individual. The method 300 further includes outputting 306 a result of the determining.

In some embodiments of the method 300, the stored 302 set of handwriting characteristics of the individual is stored in a database storing sets of handwriting characteristics of a plurality of individuals. A set of handwriting characteristics in some embodiments is stored 302 as a data representation of a plurality of handwriting characteristics. These handwriting characteristics may include, among others, one, two, or more of character slant, character forms, writing instrument direction of movement when forming a character or portion thereof, proportions between character portions, height ratios between characters, and character loop forms.

In some further embodiments of the method 300, outputting 306 the result of the determining includes outputting 306 a score generated by the determining where the score indicative of a degree of accuracy of the determining. The score may be generated in some such embodiments based on a degree of matching of certain characteristics of a handwriting fingerprint with a handwriting input, a number of matches, a frequency of matches, among other factors.

In some embodiments, the plurality of handwriting samples are stored check images. In some such embodiments, the input handwriting sample is an image of a check presented for processing.

In another embodiment, the input handwriting sample is received by a server performing at least a portion of the method 300 from a source over a network and the result of the determining is output in a data transmission from the server to the source over the network. The source may be a networked terminal, such as an ATM or other terminal.

Figure 4:
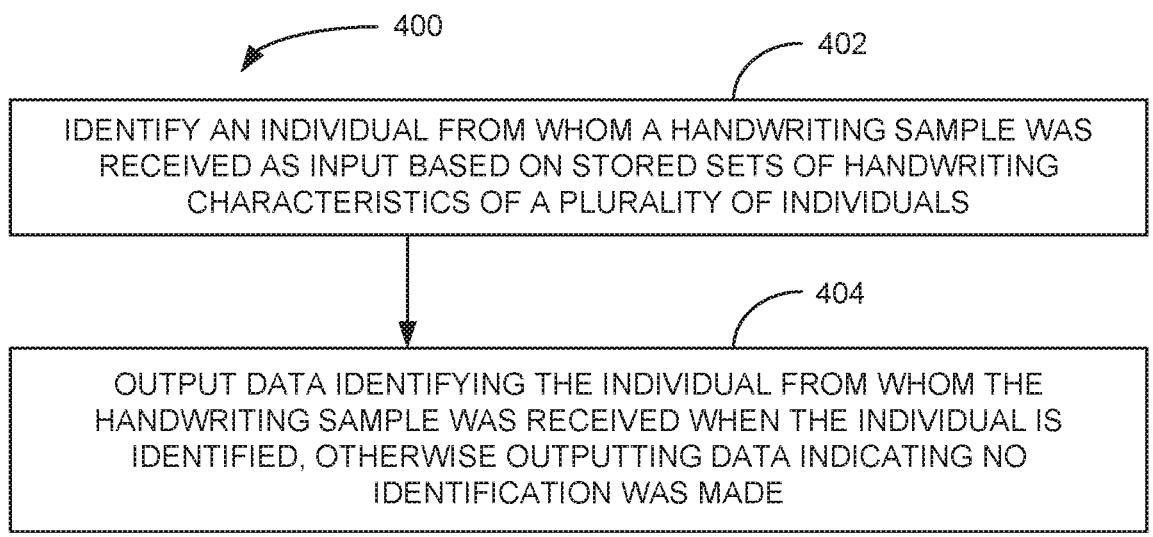
FIG. 4 is a block flow diagram of a method, according to an example embodiment.

FIG. 4 is a block flow diagram of a method 400, according to an example embodiment. The method 400 is an example of a method that may be performed in whole or in part on one or more of the one or more servers 110, the terminal 102, the imaging device 104, and the mobile device 106 of FIG. 1.

The method 400 includes identifying 402 an individual from whom a handwriting sample was received as input based on stored sets of handwriting characteristics of a plurality of individuals. The method 400 further includes outputting 404 data identifying the individual from whom the handwriting sample was received when the individual is identified, otherwise outputting data indicating no identification was made.

The method 400 may further include receiving the input handwriting sample and extracting the set of characteristics from the received handwriting sample. In some embodiments of the method 400, the handwriting sample is received and the extracting is performed on a client device that transmits a data representation of the extracted set of characteristics over a network to a computing device that performs the identifying. The input handwriting sample may initially be received as manual input into a signature pad input device. In other embodiments or other instances, the input handwriting sample may initially be received as an electronic image of a check captured by an imaging device when the check is presented for payment or for deposit.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
analyzing a set of handwriting characteristics for each of a plurality of individuals for whom handwriting data from previously processed checks that have been received and stored in a database stored on a data storage device, each set of handwriting characteristics analyzed by a process that executes on a computer processor against a plurality of handwriting samples of each individual from archived documents stored in the database to identify characteristics of an individual's handwriting across a plurality of documents associated in stored data with an identity of an individual's identity;
wherein the process identifies and extracts unique characteristics of the individual's handwriting by analyzing archived documents stored in the database to build a unique handwriting fingerprint that enables authentication of an individual in emergency situations when other identification items or solutions are not available;
the process including:
identifying and extracting representations of characteristics of handwriting from stored images of handwriting samples, the characteristics including neatness, fluidity, rhythmic, artistic embellishment, slant or inclination of characters, character forms, movement of a writing utensil when forming characters or portions thereof, proportions of character portions compared to a whole character or other portions, height ratios of characters with relation to one or more other characters, loop shape and form, pressure as is evident from line width, writing utensil lifting when forming certain characters, exit and entry strokes for characters, retracing, character and word spacing, case of letters, and other characteristics;

storing, in the database on the data storage device, a set of extracted handwriting characteristics of the individual identified during processing of the plurality of handwriting samples of each individual, wherein a stored set of handwriting characteristics of the individual is stored in the database storing sets of handwriting characteristics of a set of individuals generated from previously processed check images, each set of handwriting characteristics stored as a data representation of a plurality of handwriting characteristics including data representing of:

character slant;

character forms;

writing instrument direction of movement when forming a character or portion thereof;

proportions between character portions;

height ratios between characters; and character loop forms;

wherein storing further includes maintaining at least two or more separate data representations for a given individual who utilizes two or more distinct handwriting styles and maintaining the at least two or more separate data representations as handwriting fingerprints for corresponding individuals in the database;

receiving, by the computer processor, an input handwriting sample captured by an imaging device as an image of a check through a web service call;

computing, by the computer processor, whether the input handwriting sample captured by the imaging device as the image of the check is handwriting of the individual based on an individual's stored handwriting fingerprints, wherein computing further includes determining a degree of uniqueness for the input handwriting sample, wherein computing further includes generating a value for the degree of uniqueness for the input handwriting sample in view of the individual's stored handwriting fingerprints based on the characteristics in a set corresponding to the individual in the individual's stored handwriting fingerprints and based on corresponding characteristics extracted from the input handwriting sample, wherein the degree of uniqueness is generated based on a degree of matching of certain characteristics of a handwriting fingerprint with a handwriting input, a number of matches, and a frequency of matches;

outputting, from the computer processor, a result of the computing as the degree of uniqueness via the web service call for determination by a terminal whether the check can be used as payment or deposited at the terminal and providing the degree of uniqueness as an authentication of the individual when the individual fails to have other identification items needed for authentication of the individual associated with the check; and providing the method as a web service to the terminal.

2. The method of claim 1, wherein the plurality of handwriting samples are stored check images.

3. The method of claim 1, wherein the input handwriting sample is received by a server performing at least a portion of the method from a source over a network and the result of the determining is output in a data transmission from the server to the source over the network.

4. The method of claim 3, wherein the source is the terminal.

5. The method of claim 4, wherein the terminal is an Automated Teller Machine (ATM).

6. A system comprising:

a processor, a memory device, a network interface device, and instructions stored on the memory device that are executable by the processor to perform data processing activities, the data processing activities executed by the processor comprising:

analyzing a set of handwriting characteristics for each of a plurality of individuals for whom handwriting data from previously processed checks that have been received in digital image form and respective representations of which are stored in a database stored on the memory device, each set of handwriting characteristics analyzed by a process that executes against a plurality of handwriting samples of each individual from archived documents stored in the database to identify characteristics of an individual's handwriting across a plurality of documents associated in stored data with an identity of an the individual's identity;

wherein the process identifies and extracts unique characteristics of the individual's handwriting by analyzing archived documents stored in the database to build a unique handwriting fingerprint that enables authentication of an individual in emergency situations when other identification items or solutions are not available;

the process including:

identifying and extracting representations of characteristics of handwriting from stored handwriting samples, the characteristics including neatness, fluidity, rhythmic, artistic embellishment, slant or inclination of characters, character forms, movement of a writing utensil when forming characters or portions thereof, proportions of character portions compared to a whole character or other portions, height ratios of characters with relation to one or more other characters, loop shape and form, pressure as is evident from line width, writing utensil lifting when forming certain characters, exit and entry strokes for characters, retracing, character and word spacing, case of letters, and other characteristics;

storing, in the database on the memory device, a set of extracted handwriting characteristics of the individual identified during processing of a plurality of handwriting samples of each individual, wherein the database stores sets of handwriting characteristics for a set of individuals generated from previously processed check images, each set of handwriting characteristics stored as a data representation of a plurality of handwriting characteristics including data representation of:

character slant;

character forms;

writing instrument direction of movement when forming a character or portion thereof;

proportions between character portions;

height ratios between characters; and character loop forms;

wherein storing further includes maintaining at least two or more separate data representations for a given individual who utilizes two or more distinct handwriting styles and maintaining the at least two or more separate data representations as handwriting fingerprints for corresponding individuals in the database;

receiving, by the processor, an input handwriting sample captured by an imaging device as an image of a check through a web service call;

computing, by the processor, whether the input handwriting sample captured as the image of the check received via the network interface device is handwriting of the individual based on an individual's stored handwriting fingerprints wherein computing further includes determining a degree of uniqueness for the input handwriting sample, wherein computing further includes generating a value for the degree of uniqueness for the input handwriting sample in view of the individual's stored handwriting fingerprints based on the characteristics in a set corresponding to the individual in the individual's stored handwriting fingerprints and based on corresponding characteristics extracted from the input handwriting sample, wherein the degree of uniqueness is generated based on a degree of matching of certain characteristics of a handwriting fingerprint with a handwriting input, a number of matches, and a frequency of matches;

outputting, from the processor, a result of the computing via the network interface device via the web service call for determination by a terminal whether the check can be used as payment or deposited at the terminal and providing the degree of uniqueness as an authentication of the individual when the individual fails to have other identification items needed for authentication of the individual associated with the check; and providing the data processing activities as a web service to the terminal.

7. The system of claim 6, wherein:

the plurality of handwriting samples are stored check images.

* * * * *